United States Patent [19]
Ohta et al.

[11] Patent Number: 5,377,290
[45] Date of Patent: Dec. 27, 1994

[54] OPTICAL FIBER COMPOSITE GROUND WIRE WITH WATER ABSORPTION MEMBER AND METHOD OF MANUFACTURING THE SAME

[75] Inventors: Jun-Ichi Ohta; Satoshi Hisano, both of Yokohama, Japan

[73] Assignee: Sumitomo Electric Industries, Ltd., Osaka, Japan

[21] Appl. No.: 67,851

[22] Filed: May 27, 1993

[30] Foreign Application Priority Data

Apr. 23, 1993 [JP] Japan ................................. 5-097822

[51] Int. Cl.$^5$ ............................................. G02B 6/44
[52] U.S. Cl. ................................... 385/100; 385/101; 385/103; 385/104; 385/106; 385/105
[58] Field of Search ............... 385/100, 101, 102, 103, 385/104, 105, 106, 109, 110, 111, 112

[56] References Cited

U.S. PATENT DOCUMENTS

| | | | |
|---|---|---|---|
| 4,715,678 | 12/1987 | Johnson et al. | 385/109 |
| 4,944,570 | 7/1990 | Oglesby et al. | 385/101 |
| 5,039,197 | 8/1991 | Rawlyk | 385/102 |
| 5,071,221 | 12/1991 | Fujitani et al. | 385/100 |
| 5,179,611 | 1/1993 | Umeda et al. | 385/110 |

FOREIGN PATENT DOCUMENTS

| | | | |
|---|---|---|---|
| 0256558 | 2/1988 | European Pat. Off. | 385/101 |
| 2227855 | 8/1990 | United Kingdom | 385/101 |

Primary Examiner—Rodney B. Bovernick
Assistant Examiner—Hemung Sanghavi
Attorney, Agent, or Firm—Cushman, Darby & Cushman

[57] ABSTRACT

An optical fiber composite ground wire according to the present invention has a metal protective tube containing a grooved conductive spacer. The optical fiber cyomposite ground wire is characterized by further including a water absorption tape 3 wound around the outer surface of a spacer 1 to partly expose the spacer 1, wherein the protective tube 2 is brought into direct contact with the spacer 1 partly exposed from the water absorption tape 3, thereby electrically connecting the spacer 1 to the protective tube 2.

20 Claims, 6 Drawing Sheets

OPTICAL FIBER COMPOSITE GROUND WIRE WITH WATER ABSORPTION MEMBER AND METHOD OF MANUFACTURING THE SAME

BACKGROUND OF THE INVENTION

1. Field of the Invention

The present invention relates to an optical fiber composite ground wire including a protective tube containing a grooved conductive spacer, and a method of manufacturing the same.

2. Related Background Art

An optical fiber is free from electromagnetic induction interference in spite of its large information transmission capacity. Owing to such characteristics, the optical fiber can be incorporated in an aerial cable or a general power line. Therefore, a communication cable need not be separately installed. There is proposed a structure for incorporating such an optical fiber cable in an aerial cable, in which part of a stranded conductor is replaced with an optical fiber cable unit.

A conventional optical fiber composite ground wire and its manufacturing method are known (Japanese Patent Laid-Open No. 58-7607). In this wire, an optical fiber unit is arranged in a helical groove, formed in a spacer, together with a jelly, and a metal film is formed on the outer surface of the spacer.

According to the above-described related art, in the process of forming a metal film on the outer surface of a spacer, when a plate-like conductor is processed by roll forming, and the butted portions of the conductor are welded, a jelly enters a weld point to cause variations in welded state, resulting in a defective product.

SUMMARY OF THE INVENTION

It is an object of the present invention to provide an optical fiber composite ground wire having a water absorbing function without using a jelly.

In order to achieve the above object, according to the present invention, there is provided an optical rider composite ground wire having a metal protective tube containing a grooved conductive spacer, comprising a water absorption member arranged around an outer surface of the spacer to partly expose the spacer, wherein the spacer partly exposed from the water absorption member is brought into direct contact with the protective tube, thereby electrically connecting the spacer to the protective tube.

According to the present invention, there is provided a method of manufacturing an optical fiber composite ground wire having a metal protective tube containing a grooved conductive spacer, characterized by comprising the steps of preparing a spacer having an optical fiber housed in a groove, arranging a water absorption member around an outer surface of the spacer to partly expose a surface of the spacer, butting a metal tape along a longitudinal direction of the spacer having the water absorption member arranged therearound, and causing the metal tape to wrap the spacer by roll forming, performing a squeezing process with respect to the metal tape having undergone roll forming, thereby bringing the spacer, partly exposed between portions of the water absorption member, into direct contact with the metal tape, and joining butted portions of the metal tape.

According to the optical fiber composite ground wire of the present invention, the water absorbing member is inserted between the spacer and the protective tube, and the spacer and the protective tube has portions which are physically in contact with each other. With this structure, electrical connection between the spacer and the protective tube is ensured. When water enters from the outside, the water absorbing member arranged at the portion where the water enters swells to immediately fill up the gap between the spacer and the protective tube, thereby preventing entrance of water.

In the method of manufacturing an optical fiber composite ground wire according to the present invention, the water absorbing member is arranged on the outer surface of the spacer having the optical fiber arranged in the groove. Thereafter, the metal tape is wound around the spacer in the form of a cylinder. In addition, the spacer and the metal tape are physically brought into contact with each other by a squeezing process, thus ensuring electrical connection between the spacer and the metal tape.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

An optical fiber composite ground wire and a method of manufacturing the same according to an embodiment of the present invention will be described below with reference to the accompanying drawings. Note that the same reference numerals denote the same parts, and a repetitive description will be avoided.

Figure 1:
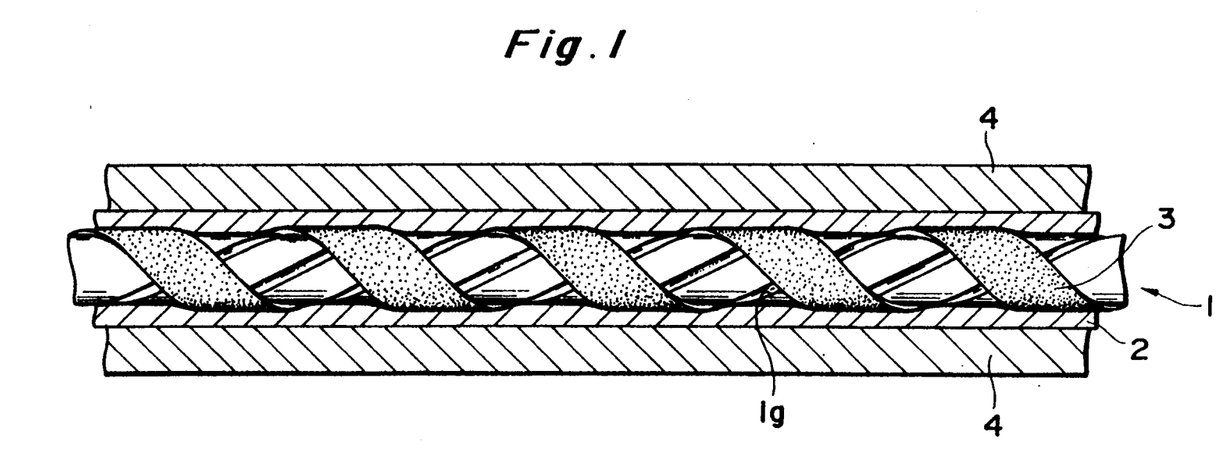
FIG. 1 is a partial sectional view of a protective tube, showing the internal structure of the optical fiber composite ground wire.

An optical fiber composite ground wire and a method of manufacturing the same according to the first embodiment of the present invention will be described first with reference to FIG. 1.

The optical fiber composite ground wire according to this embodiment is constituted by a spacer 1 formed of a conductive material (aluminum, copper, steel, or the like), a protective tube 2 formed of a metal (aluminum or the like), and a water absorption tape 3 having a water absorbing function. A helical groove 1g is formed in the outer surface of the spacer 1. An optical fiber unit (not shown) is housed in the groove 1g. The water absorption tape 2 is wound around the spacer 1. As the water absorption tape 3, for example, a fibrous tape may be used, which has its front and back surfaces coated with an adhesive and its front surface sprinkled with a swelling powder. The swelling powder has the property of absorbing moisture and swelling in a short time (swelling property). When the powder swells, it is transformed into a hydrophobic gel-like substance. For this reason, when water reaches the water absorption tape 3, the swelling powder is removed off from the tape 3. As a result, the gap between the spacer 1 and the protective tube 2 is filled up with the hydrophobic substance.

As a swelling powder, a high-water-absorption resin "AQUA KEEP" (registered trade name) available from Sumitomo Seika Chemicals Co., Ltd. can be used. The "AQUA KEEP" has the following characteristics. The water absorbing capacity of this resin with respect to distilled water is equivalent to 200 to 1,000 times its weight. The water absorbing speed of the resin can be arbitrarily controlled. Water absorbed by the resin is not discharged even under a little pressure. The resin also absorbs water vapor. Even after moisture absorption, the fluidity of the resin is excellent. Even the resin has a high water absorbing capacity, it has a high gel strength. When the resin is reserved as a power at room temperature, no change in water absorbing capacity is recognized.

Figure 2:
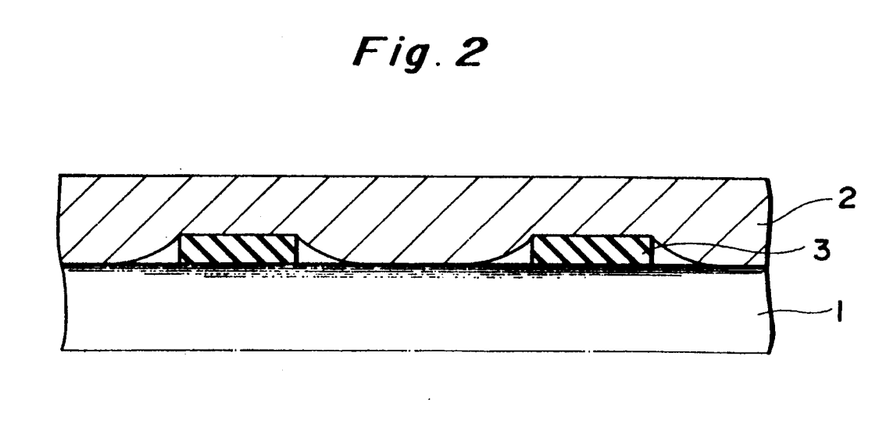
FIG. 2 is an enlarged sectional view of the protective tube, a water absorption tape, and a spacer, showing the mounting structure of the protective tube, the water absorption tape, and the spacer.

The above-described water absorption tape 3 is laterally wound around the spacer 1 at a pitch equal to the tape width to cross the groove 1g. With this structure, the optical fiber unit housed in the groove 1g is urged into it by the water absorption tape 1 so as not to slip off from the groove 1g. Since the spacer 1 is held in a pressed state by the protective tube 2, the surface portions of the spacer 1, exposed from the water absorption tape 3, are always in partial contact with the inner surface of the protective tube 2 (see FIG. 2). Note that a conductive strand layer 4 is formed on the outer surface of the protective tube 2.

With the above-described arrangement of the optical fiber composite ground wire according to the first embodiment, when, for example, water enters from the outside and reaches the water absorption tape 3, the swelling powder on the water absorption tape 3 absorbs the water and swells in a short time. As a result, the gap between the spacer 1 and the protective tube 2 is filled up with a hydrophobic gel-like substance transformed from the swelling powder. Therefore, the water which has entered from the outside is completely shut out.

Note that since the gap between the spacer 1 and the protective tube 2 is set in consideration of the swelling ratio and swelling time of the swelling powder, the conductivity between the spacer 1 and the protective tube 2 is not lost.

The optical fiber composite ground wire according to the first embodiment is manufactured through the following steps. First, the spacer 1 having an optical fiber unit (not shown) arranged in the groove 1g is prepared. The water absorption tape 3 is then wound around the outer surface of the spacer 1 such that the surface of the spacer 1 is partially exposed. Thereafter, a metal tape having a width larger than at least the circumference of the spacer 1 is butted against the spacer 1, which has the water absorption tape 3 arranged therein, along the longitudinal direction of the spacer 1, and the metal tape is wrapped around the spacer 1 by a roll forming technique. The metal tape processed by roll forming is subjected to a squeezing process to bring the surface portions, of the spacer 1, exposed from the water absorption tape 3 into direct contact with the metal tape. Subsequently, the butted portions of the metal tape are welded.

As the above-mentioned roll forming and squeezing processes, conventional techniques (Japanese Patent Laid-Open No. 58-7607) can be used without any modification, and hence a detailed description thereof will be omitted. In general, an aluminum tape is processed by roll forming, and the butted portions of the tube are welded. With this process, a tube having a diameter about twice the outer diameter of a spacer is formed. Thereafter, the inner diameter of the protective tube is continuously reduced to be almost equal to the outer diameter of the spacer by sinking. In the above embodiment, by changing the degree of sinking, the spacer 1 and the protective tube 2 can be brought into partial contact with each other. Therefore, a water stopping effect can be obtained by means of a water absorption tape without degrading the electrical performance of the optical fiber composite ground wire.

Figure 3:
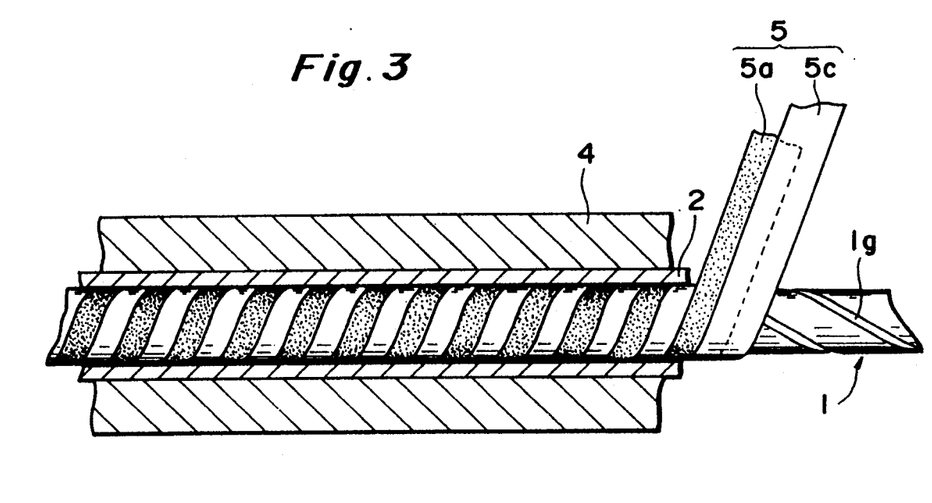
FIG. 3 is a partial sectional view of a protective tube with part of a water absorption tape peeled off, thus showing the internal structure of the optical fiber composite ground wire.
Figure 4:
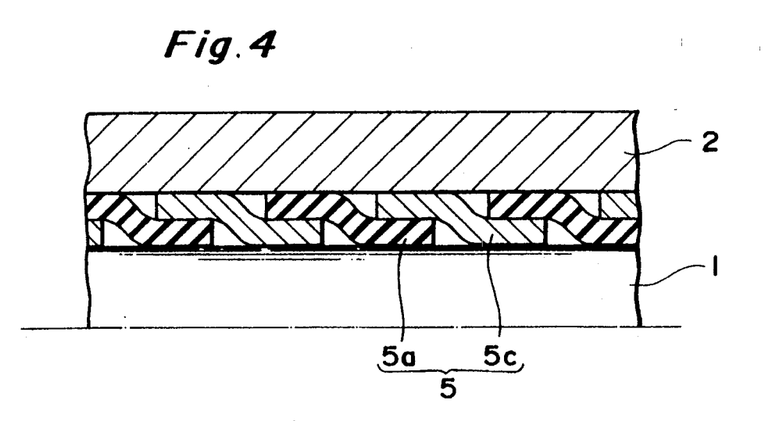
FIG. 4 is an enlarged sectional view of the protective tube, the water absorption tape, and a spacer, showing a mounting structure of the protective tube, the water absorption tape, and the spacer.

An optical fiber composite ground wire and a method of manufacturing the same according to the second embodiment of the present invention will be described next with reference to FIGS. 3 and 4.

The optical fiber composite ground wire according to this embodiment is constituted by a conductive spacer 1, a metal protective tube 2, and a water absorption tape 5. The difference between the first and second embodiments is that the second embodiment uses the composite tape 5 constituted by a water absorption tape 5a and a conductive tape 5c which overlap partially each other.

The composite tape 1 is wound around the spacer 1 such that the conductive tape 5c is exposed. In this state, the conductive tape 5c and the water absorption tape 5a are alternately wound in the lateral direction. With this structure, the conductive tape 5c constitutes an electrical bridge between the spacer 1 and the protective tube 2 so that the spacer 1 and the protective tube 2 are electrically connected to each other, and the water absorption tape 5a exhibits a water stopping effect in case of entrance of water.

In this embodiment, the conductive tape 5c and the water absorption tape 5a have almost the same thickness. However, the conductive tape 5c may be thicker than the water absorption tape 5a. According to such an arrangement, the conduction between the spacer 1 and the protective tube 2 can be ensured.

With the above-described arrangement of the optical fiber composite ground wire according to the second embodiment, when, for example, water enters from the outside and reaches the water absorption tape 5a, a swelling powder on the water absorption tape 5a absorbs the water and swells in a short time. As a result, the gap between the spacer 1 and the protective tube 2 is filled up with a hydrophobic gel-like substance transformed from the swelling powder. Therefore, the water which has entered from the outside is completely shut out. Note that since the gap between the spacer 1 and the protective tube 2 is set in consideration of the swelling ratio and swelling time of the swelling powder, the conductivity between the spacer 1 and the protective tube 2, obtained through the conductive tape 5c, is not lost.

The optical fiber composite ground wire according to the second embodiment is manufactured through the following steps. The spacer 1 having an optical fiber unit (not shown) arranged in a groove 1g is prepared together with the composite tape 5 constituted by the water absorption tape 5a and the conductive tape 5c which overlap each other along the longitudinal direction. The composite tape 5 is wound around the outer surface of the spacer 1 such that at least the conductive tape 5c is exposed. In the embodiment, the composite tape 5 is wound around the spacer 1 to cross the groove 1g. However, the composite tape 5 may be wound around the spacer 1 in a direction parallel to the groove 1g because the composite tape 5 is wound around the spacer 1 without any gap such that the spacer 1 is not exposed. Thereafter, a metal tape (not shown) having a width larger than at least the circumference of the spacer 1 is butted against the spacer 1, which has the composite tape 5 arranged therein, along the longitudinal direction of the spacer 1, and the metal tape is wrapped around the spacer 1 by a roll forming technique. The metal tape processed by roll forming is subjected to a squeezing process to bring both ends of the conductive tape 5c into direct contact with at least the spacer 1 and the protective tube 2. Subsequently, the butted portions of the metal tape are jointed to each other by welding or the like.

Figure 5:
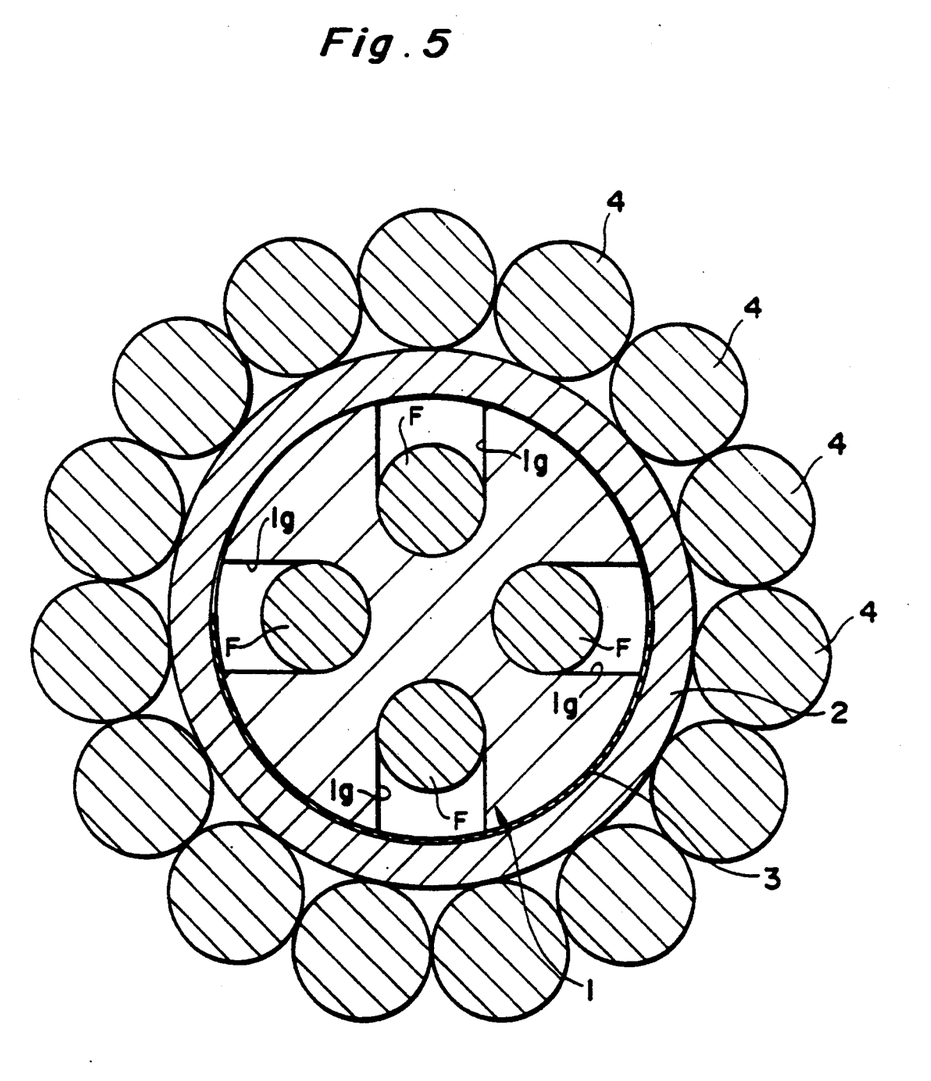
FIG. 5 is a sectional view taken along a plane perpendicular to the axis of the optical fiber composite ground wire.

An optical fiber composite ground wire and a method of manufacturing the same according to the third embodiment of the present invention will be described next with reference to FIG. 5.

The third embodiment is different from the first embodiment in that a water absorption tape 3 having a width smaller than the circumference of a spacer 1 is arranged along the longitudinal direction of the spacer 1 and is wound along its arc. In this structure, the water absorption tape 3 is inserted between portions of the spacer 1 and the protective tube 2, while the remaining portions of the spacer 1 and the protective tube 2 are in direct contact with each other. Therefore, the optical fiber composite ground wire of the embodiment has a water stopping performance, and allows the spacer 1 and the protective tube 2 to be electrically connected to each other.

Assume that part of the protective tube 2 is broken to allow entrance of water, and that the water has reached the water absorption tape 3. In this case, the swelling powder adhering to the water absorption tape 3 absorbs the water and swells in a short time. As a result, the gap between the spacer 1 and the protective tube 2 is filled up with a hydrophobic gel-like substance transformed from the swelling powder. For this reason, the water which has entered from the outside is completely shut out. Note that since the width of the water absorption tape 3 is set in consideration of the swelling ratio and swelling time of the swelling powder, the conductivity between the spacer 1 and the protective tube 2 is not lost.

The method of manufacturing the optical fiber composite ground wire according to the third embodiment will be described next. First, the spacer 1 having an optical fiber unit F on the bottom portion of a groove 1g is prepared (see FIG. 5). The water absorption tape 3 is placed adjacent to a lower portion of the spacer 1 along its longitudinal direction. Thereafter, a metal tape (not shown) having a width larger than at least the circumference of the spacer 1 is butted against the spacer 1 along its longitudinal direction, and the metal tape is wrapped around the spacer 1 and the water absorption tape 3 by a roll forming technique. The metal tape processed by roll forming is subjected to a squeezing process to bring an upper portion of the spacer 1 into direct contact with the metal tape. Subsequently, the butted portions of the metal tape are joined to each other by welding or the like.

In this case, the step of mounting a water absorption tape can be omitted by using a metal tape having a water absorption tape fixed, in advance, to its surface which is brought into contact with a spacer.

Figure 6:
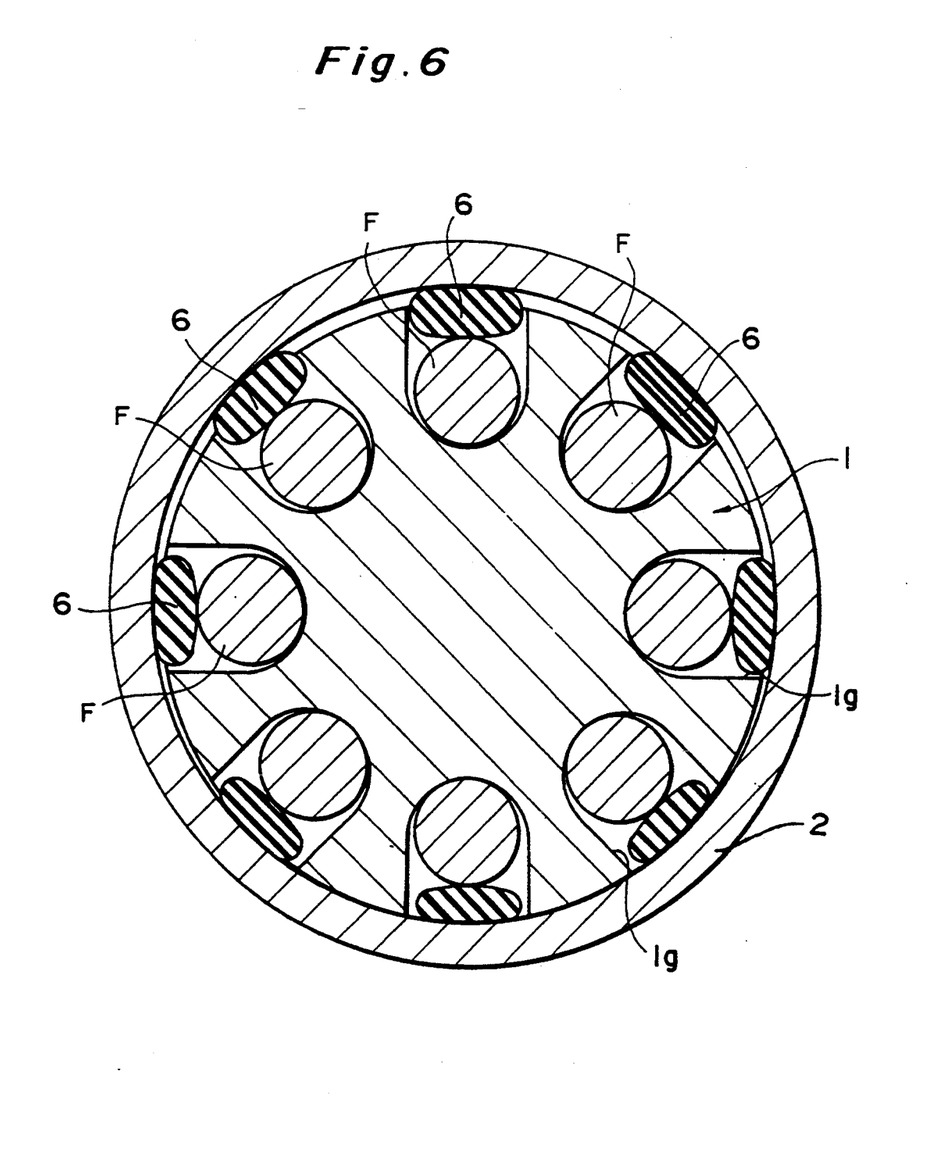
FIG. 6 is a sectional view taken along a plane perpendicular to the axis of the optical fiber composite ground wire.

An optical fiber composite ground wire and a method of manufacturing the same according to the fourth embodiment of the present invention will be described next with reference to FIG. 6.

The optical fiber composite ground wire according to this embodiment is constituted by a spacer 1, a protective tube 2, and a water absorption yarn 6. A helical groove 1g is formed in the outer surface of the spacer 1. An optical fiber unit F is arranged on the bottom portion of the groove 1g. The water absorption yarn 6 is arranged outside the optical fiber unit F. The water absorption yarn 6 is formed of a fiber(textile) string having an adhesive coated thereon and a swelling powder sprinkled on its surface. In this embodiment, for example, a 200-denier material can be used. The protective tube 2 is arranged around the spacer 1 so that the optical fiber unit F and the water absorption yarn 6 in the groove 1g are held therein by the protective tube 2. Since there is nothing between the spacer 1 and the protective tube 2, part (e.g., a lower portion) of the spacer 1 is in direct contact with the protective tube 2 without causing the protective tube 2 to urge the spacer 1. Therefore, the conduction between the spacer 1 and the protective tube 2 is ensured.

Various modifications of this embodiment can be made. The water absorption yarn 6 need not always be arranged in the groove 1g and may protrude therefrom.

In the embodiment, there is nothing between the spacer 1 and the protective tube 2. However, as in the first embodiment, another water absorption yarn 6 may be laterally wound around the outer surface of the spacer 1. In this case, the spacer 1 is wrapped in the protective tube 2 under pressure so that the portions, of the spacer 1, exposed between the portions of the laterally wound water absorption yarn are brought into direct contact with the protective tube 2, thus realizing electrical connection between the spacer 1 and the protective tube 2.

In addition, as in the second embodiment, the water absorption tape 5 may be laterally wound around the outer surface of the spacer 1. Similarly, in this case, the spacer 1 is wrapped in the protective tube 2 under pressure so that electrical connection between the spacer 1 and the protective tube 2 is realized by the laterally wound conductive tape 5c.

Furthermore, as in the third embodiment, the water absorption tape 3 may be arranged along the longitudinal direction of the spacer 1. Similarly, the spacer 1 is wrapped in the protective tube 2 under pressure so that the portions, of the spacer 1, with which the water absorption tape is not in contact are brought into direct contact with the protective tube 2 so as to realize electrical connection between the spacer 1 and the protective tube 2.

In the above-described modifications, since the water absorption tapes are arranged to overlap each other, the water stopping performance is enhanced.

With the above-described arrangement of the optical fiber composite ground wire according to the fourth embodiment, when, for example, water enters from the outside and reaches the water absorption yarn 6, a swelling powder on the water absorption yarn 6 absorbs the water and swells in a short time. As a result, the gap between the spacer 1 and the protective tube 2 is filled up a hydrophobic gel-like substance transformed from the swelling powder. Therefore, the water which has entered from the outside is completely shut out.

The optical fiber composite ground wire according to the fourth embodiment is manufactured through the following steps. First, the spacer 1 having the optical fiber unit F and the water absorption yarn 6 arranged In the groove 1g is prepared. A metal tape (not shown) having a width larger than at least the circumference of the spacer 1 is butted against the spacer 1 along its longitudinal direction, and the metal tape is wrapped around the spacer 1 by a roll forming technique. Thereafter, the butted portions of the metal tape are welded. As described above, when the water absorption tape 3 or the water absorption tape 5 is wound around the outer surface of the spacer 1, squeezing of the metal tape is performed after roll forming so that the metal tape is brought into direct contact with the spacer 1.

In this embodiment, by using the method of arranging the optical fiber unit F in the groove, the water absorption yarn 6 can be arranged near the groove. Therefore, the manufacturing process is simplified to allow easy manufacture of an optical fiber composite ground wire, providing great merits in practical applications.

Figure 7:
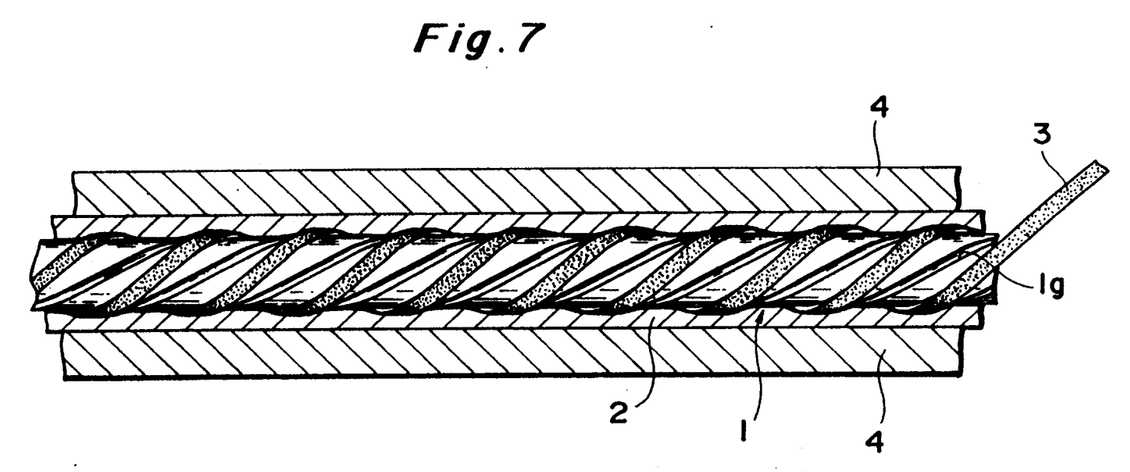
FIG. 7 is a partial sectional view of a protective tube, showing the internal structure of the optical fiber composite ground wire.

An optical fiber composite ground wire and a method of manufacturing the same according to the fifth embodiment of the present invention will be described next with reference to FIG. 7. The arrangement of the optical fiber composite ground wire of this embodiment is different from that of the first embodiment but is similar to that of the fourth embodiment in that a water absorption tape 3 is wound around a spacer 1 to cross a groove 1g at an acute angle. In this case, the water absorption tape 3 may be inserted in the groove 1g.

The method of manufacturing the optical fiber composite ground wire according to the fifth embodiment is basically the same as that of the first embodiment. In this embodiment, however, since the water absorption tape 3 which crosses the groove 1g at an acute angle is used, the water absorption tape 3 can be wound around the outer surface of the spacer 1 in the process of housing an optical fiber unit F in the groove 1g at the same time.

The result of an experiment based on the comparison between optical fiber composite ground wires according to the present invention and conventional optical fiber composite ground wires will be described next. In this experiment, optical fiber composite ground wires according to the present invention and conventional optical fiber composite ground wire were manufactured by using a core having an outer diameter of 1.2 mm and having an optical unit housed therein. The core was formed by integrating six single-mode optical fibers with an aluminum spacer having an outer diameter of 4.8 mm, four grooves, a groove depth of 1.6 mm, and a groove width of 1.4 mm by using an ultraviolet-curing resin. A water ingress test and an electric resistance measurement were performed with respect to each optical fiber composite ground wire.

The optical fiber composite ground wire according to the first embodiment, used in the experiment, had the following structure (structure No. 1). A water absorption tape having a width of 10 mm and a thickness of 0.27 mm was laterally wound around the core at a pitch of 10 mm. The resultant structure was enclosed within an aluminum protective tube having an outer diameter of 6.0 mm. A conductive strand was wound around the outer surface of the protective tube.

The optical fiber composite ground wire according to the second embodiment, used in the experiment, had the following structure (structure No. 2). A water absorption tape and an aluminum tape, each having a width of 10 mm and a thickness of 0.27 mm, were alternately wound around the core to overlap each other by 5 mm. The resultant structure was enclosed within an aluminum protective tube having an outer diameter of 6.0 mm. A conductive strand was wound around the outer surface of the protective tube.

The optical fiber composite ground wire according to the third embodiment, used in the experiment, had the following structure (structure No. 3). A water absorption tape having a width of 7.5 mm and a thickness of 0.27 mm was inserted between the core and an aluminum protective tube having an outer diameter of 6.0 mm. A conductive strand was wound around the outer surface of the protective tube.

The optical fiber composite ground wire, as a first conventional example, had the following structure (structure No. 4). The core was enclosed within an aluminum protective tube having an outer diameter of 6.0 mm. A conductive strand was wound around the outer surface of the protective tube.

The optical fiber composite ground wire, as a second conventional example, had the following structure (structure No. 5). A water absorption tape having a width of 10 mm and a thickness of 0.27 mm was laterally wound around the core so as to overlap itself by half. The resultant structure was enclosed within an aluminum protective tube having an outer diameter of 6.0 mm. A conductive strand was wound around the outer surface of the protective tube.

In each water ingress test, water of 1 atm was supplied from one end of a 1 m(one meter=3.3 ft) long sample, and the distance the water ran after a lapse of one hour was measured. As indicated by Table 1, the samples could stop the water within 1 m except for the sample having structure No. 4.

TABLE 1

| | Result of water ingress test | | | | |
|---|---|---|---|---|---|
| Structure No. | 1 | 2 | 3 | 4 | 5 |
| Distance that water ran (cm) | 53 | 38 | 86 | 100 or more | 24 |

Figure 8:
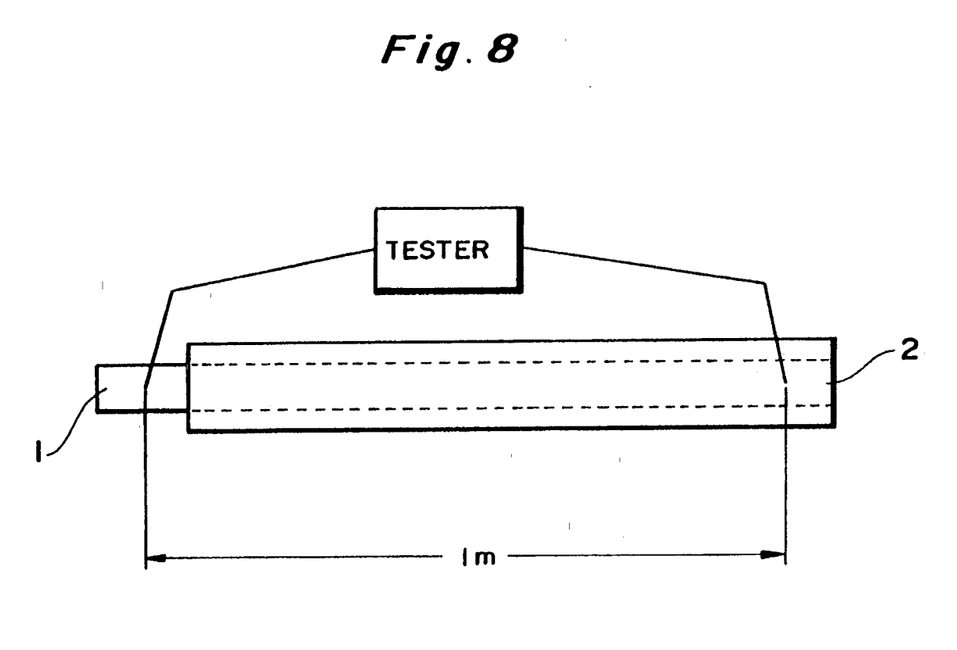
FIG. 8 is a view showing a schematic arrangement of an electric resistance measurement unit for comparing the optical fiber composite ground wires according to the present invention with those according to the related art.

In each electric resistance measurement, as indicated by FIG. 8, the resistance between the spacer 1 and the protective tube 2, which were exposed from one end of a 1 m long sample, was measured by a tester. As indicated by Table 2, it was found that the spacers 1 and the protective tubes 2 of the samples, except for the sample having structure No. 5, were electrically connected to each other.

TABLE 2

| | Result of electric resistance measurement | | | | |
|---|---|---|---|---|---|
| Structure No. | 1 | 2 | 3 | 4 | 5 |
| Electric resistance ($\Omega$) | 0.04 | 0.03 | 0.04 | 0.02 | $\infty$ |

It was found that each conventional optical fiber composite ground wire has a defect either in water stopping performance or in conduction performance. In contrast to this, it was found that all the optical fiber composite ground wires according to the present invention had both water stopping performance and conducting performance.

As has been described above, according to the optical fiber composite ground wires of the present invention, water stopping performance can be obtained without degrading the electrical characteristics as those of an overhead ground wire. Therefore, the present invention can be effectively used in areas where the possibility of entrance of water is high, such as an area of ample rainfall or an area of ample snowfall.

The present invention is not limited to the embodiments described above. For example, in the first embodiment, the water absorption tape is wound around the spacer with a gap to expose part of the spacer to the protective tube. However, a water absorption tape having a hole large enough to ensure conduction may be used.

With the above-described arrangement of the present invention, a water absorbing function can be obtained for an optical fiber composite ground wire without using a jelly and degrading the electrical characteristics as those of a composite ground wire.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber composite ground wire, comprising:
    a metal protective tube,
    a grooved conductive spacer disposed within protective tube,
    a single and continuous water absorption member arranged around an outer surface of said spacer between said spacer and said protective tube so as to cross-over a said spacer and to partly expose a portion of said spacer,
    wherein said exposed portion of said spacer is in direct contact with said protective tube, thereby electrically connecting said spacer to said protective tube.

2. An optical fiber composite ground wire according to claim 1, wherein said water absorption member is a water absorption tape wound around said spacer with a gap.

3. An optical fiber composite ground wire according to claim 2, further including a conductive tape, said water absorption tape overlapping only part of said conductive tape in a direction perpendicular to the longitudinal direction, and
    both end portions of said conductive tape in a direction perpendicular to a longitudinal direction of said conductive tape are in direct contact with said spacer and said protective tube, thereby electrically connecting said spacer to said protective tube.

4. An optical fiber composite ground wire according to claim 1, wherein said water absorption member is a water absorption tape arranged along a longitudinal direction of said spacer.

5. An optical fiber composite ground wire according to claim 1, wherein said water absorption member is arranged outside an optical fiber housed in the groove, and is sealed in the groove by said protective tube.

6. An optical fiber composite ground wire according to claim 5, further comprising a tape wound around the outer surface of said spacer with a gap to partly expose said spacer.

7. An optical fiber composite ground wire according to claim 6, characterized in that said tape is a water absorption tape.

8. A method of manufacturing an optical fiber composite ground wire having a metal protective tube containing a grooved conductive spacer, the method comprising the steps of:
    preparing a spacer having an optical fiber housed in a groove thereof,
    arranging a single and continuous water absorption member around an outer surface of said spacer so as to cross-over said groove and to partly expose a surface of said spacer,
    butting a metal tape along a longitudinal direction of said spacer having said water absorption member arranged therearound, and causing said metal tape to wrap said spacer by roll forming,
    performing a squeezing process with respect to said metal tape having undergone roll forming, thereby bringing said spacer, partly exposed between portions of said water absorption member, into direct contact with said metal tape, and
    joining butted portions of said metal tape.

9. A method of manufacturing an optical fiber composite ground wire according to claim 8, characterized in that a water absorption tape is used as the water absorption member in the step of arranging said water absorption member, and
    said water absorption tape is wound around said spacer with a gap along a longitudinal direction of said spacer.

10. A method of manufacturing an optical fiber composite ground wire according to claim 8, characterized in that a composite tape constituted by a water absorption tape and a conductive tape overlapping each other along the longitudinal direction is used as the water absorption member in the step of arranging said water absorption member, and said composite tape is wound around an outer surface of said spacer such that at least said conductive tape is exposed.

11. A method of manufacturing an optical fiber composite ground wire according to claim 8, characterized in that a water absorption tape is used as said water absorption member in the step of arranging said water absorption member, and said water absorption tape is arranged along a longitudinal direction of said spacer.

12. A method of manufacturing an optical fiber composite ground wire according to claim 8, characterized in that a water absorption member having a width smaller than a groove width of said spacer is used as said water absorption member in the step of arranging said water absorption member, and said water absorption member is arranged in the groove outside said optical fiber.

13. An optical fiber composite ground wire comprising:

a conductive spacer having a groove continuously formed in an outer surface thereof, an optical fiber unit housed in the groove, a water absorbing member arranged on the outer surface of said spacer so as to crossover said groove and partly expose said spacer, a metal protective tube in direct contact with a portion of said spacer, exposed from said water absorption member, and a strand arranged around said protective tube.

14. An optical fiber composite ground wire according to claim 13, wherein the groove is helically formed.

15. An optical fiber composite ground wire according to claim 14, wherein said optical fiber unit has a unit structure obtained by integrating a plurality of optical fibers, and a bottom surface of the groove is shaped in accordance with the unit structure of said optical fiber.

16. An optical fiber composite ground wire according to claim 15, wherein the exposed portion of said spacer is continuous along a longitudinal direction.

17. An optical fiber composite ground wire according to claim 16, wherein water absorption members, each identical to said water absorption member, equal in number to the grooves are used, and one each of said water absorption members is arranged in one of the grooves outside said optical fiber unit.

18. An optical fiber composite ground wire according to claim 17, further comprising a water absorption tape inserted between said spacer and said protective tube, said water absorption tape is wound around an outer surface of said spacer with a gap to cross the groove in said spacer, and said spacer and said protective tube are partly in direct contact with each other.

19. An optical fiber composite ground wire according to claim 16, wherein said water absorption member is wound around an outer surface of said spacer with a gap to cross the groove in said spacer at an acute angle, and said spacer and said protective tube are partly in direct contact with each other.

20. A method of manufacturing an optical fiber composite ground wire having a metal protective tube containing a conductive grooved spacer, comprising the steps of:

arranging an optical fiber unit within a groove in said spacer and arranging a water absorption member outside the groove and about a periphery of said spacer so as to cross said groove, butting a metal tape by roll forming so as to wrap said spacer along a longitudinal direction of said spacer, and joining butted portions of said metal tape.

* * * * *